(12) United States Patent
Dai et al.

(10) Patent No.: US 9,675,155 B2
(45) Date of Patent: Jun. 13, 2017

(54) FABRIC CONTAINER WITH LIGHT TRANSMISSION

(71) Applicants: Jianming Dai, San Jose, CA (US); Banghui An, Shenzhen (CN)

(72) Inventors: Jianming Dai, San Jose, CA (US); Banghui An, Shenzhen (CN)

(73) Assignee: Ming D&Y Inc., San Jose, CA (US)

( * ) Notice: Subject to any disclaimer, the term of this patent is extended or adjusted under 35 U.S.C. 154(b) by 65 days.

(21) Appl. No.: 14/544,965

(22) Filed: Mar. 9, 2015

(65) Prior Publication Data

US 2016/0265760 A1    Sep. 15, 2016

(51) Int. Cl.
| F21V 33/00 | (2006.01) |
| F21V 23/02 | (2006.01) |
| A45F 3/00 | (2006.01) |
| A45C 15/06 | (2006.01) |
| G02B 6/42 | (2006.01) |
| F21V 8/00 | (2006.01) |
| A45F 3/04 | (2006.01) |

(52) U.S. Cl.
CPC ............ *A45C 15/06* (2013.01); *G02B 6/0011* (2013.01); *G02B 6/428* (2013.01); *A45F 3/005* (2013.01); *A45F 3/04* (2013.01); *A45F 2003/003* (2013.01)

(58) Field of Classification Search
CPC ....... A45C 15/06; G02B 6/0011; G02B 6/428
See application file for complete search history.

(56) References Cited

U.S. PATENT DOCUMENTS

| 5,245,516 | A | * | 9/1993 | de Haas ................. A41D 13/01 2/338 |
| 5,570,945 | A | | 11/1996 | Chien et al. |
| 5,613,756 | A | | 3/1997 | Allen |
| 5,660,460 | A | | 8/1997 | McLeod |
| 5,688,038 | A | | 11/1997 | Chien |
| 5,836,671 | A | | 11/1998 | Chien |
| 5,879,076 | A | | 3/1999 | Cross |
| 7,055,978 | B2 | | 6/2006 | Worthington |
| 7,270,438 | B2 | | 9/2007 | Chen |
| 7,410,271 | B1 | | 8/2008 | Man |
| 8,282,235 | B2 | | 10/2012 | Gilligan |
| 2012/0085298 | A1 | * | 4/2012 | Wolters ................ A01K 27/006 119/859 |
| 2014/0146525 | A1 | | 5/2014 | Lueptow |

FOREIGN PATENT DOCUMENTS

CN    202302948 U    7/2012

OTHER PUBLICATIONS

Prior Public Use device with Distablespring, one page photo.

* cited by examiner

*Primary Examiner* — Elmito Breval

(57) ABSTRACT

A light transmitting device has a flexible elongated substantially flat band of high clarity light transmitting polymeric material. An LED is mounted by a mounting structure immediately adjacent but not embedded in an end of the band, and electrical wiring extends from the LED to a battery. The band is incorporated in a container (e.g. backpack, fanny pack, clutch) made at least partially of fabric so that light emitted from the band is visible from the exterior of the container. A battery and printed circuit board are mounted in the interior of the container, and an electrical switch for operating the LED is accessible from the exterior of the container. A flap stitched onto the front panel of the container covers the band and holds it in place but allows light to get through.

20 Claims, 9 Drawing Sheets

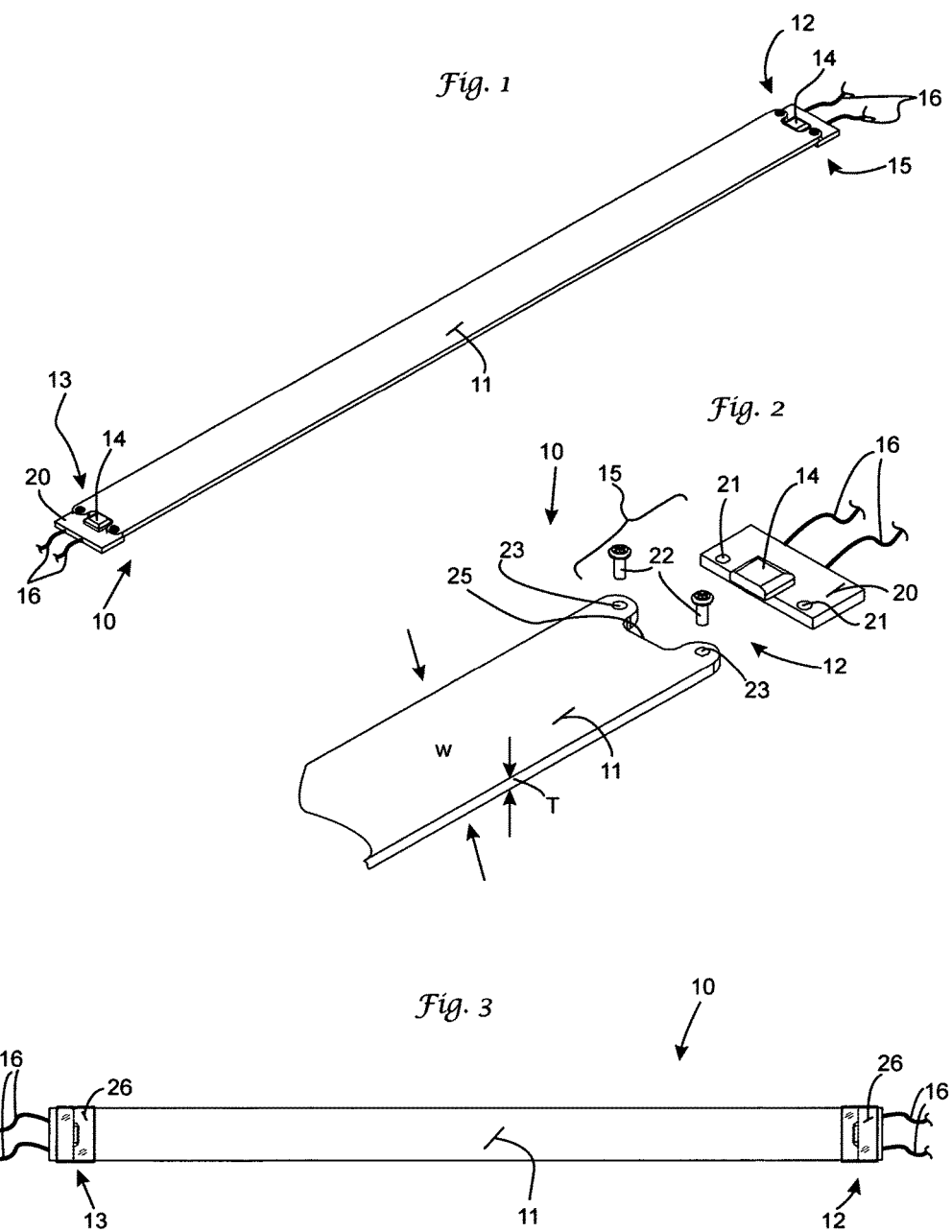

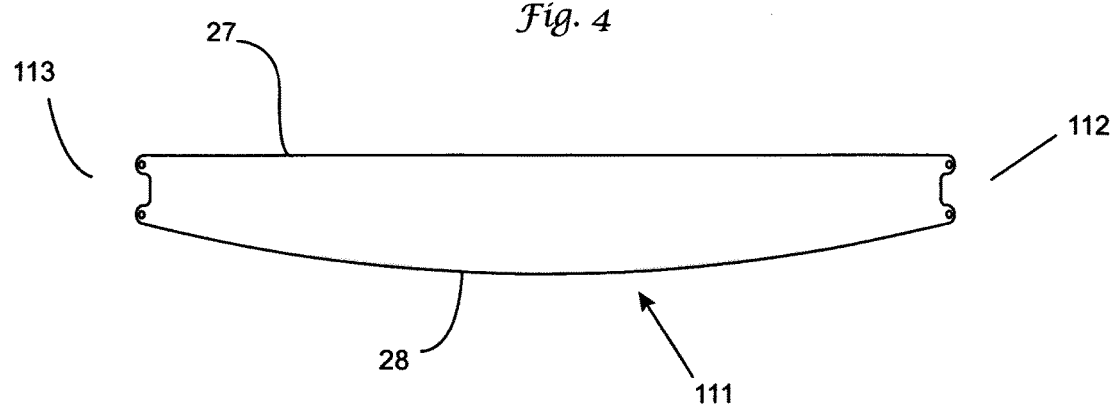
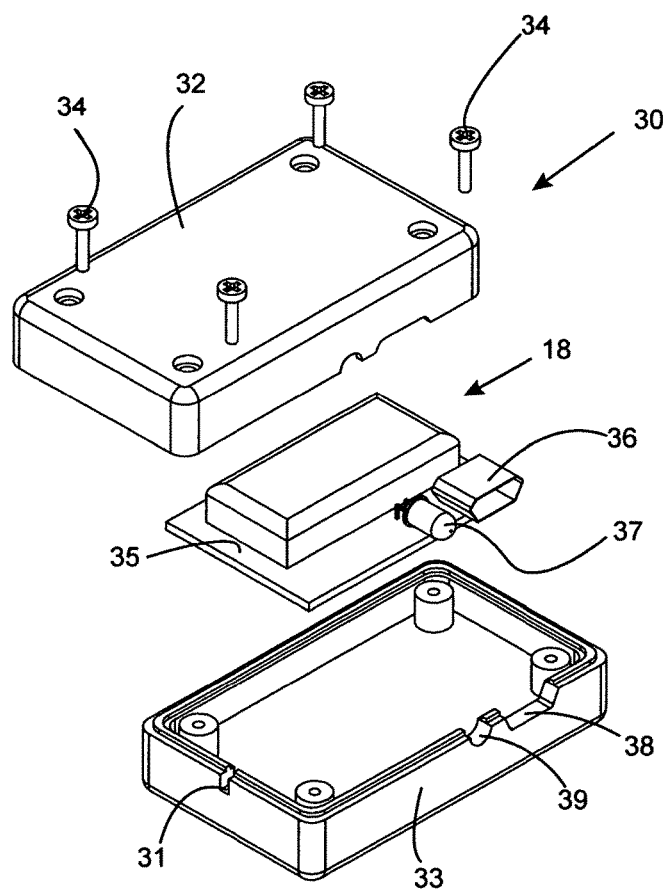

FABRIC CONTAINER WITH LIGHT TRANSMISSION

BACKGROUND AND SUMMARY OF THE INVENTION

There are many situations where it is desirable to have a highly portable flexible light transmitting device associated with a container, such as a wearable container primarily of fabric. Some examples of the many types of wearable containers include fanny packs, purses with shoulder straps, shoulder bags, back packs, knapsacks, and belt mounted pouches. Other types of primarily fabric containers that also can be enhanced by incorporating a light transmitting element include clutches, dopp kits, lunch boxes, and coolers (with or without frames). While there have been many proposals for such devices in the past, such as shown in U.S. Pat. Nos. 5,836,671, 7,270,438, 7,410,271, and 8,282,235, they do not necessarily have the highest visibility of the light source for a given cost or ease of construction, nor absolutely the best light transmission for a given amount of battery power, nor do they necessarily have great adaptability.

According to the present invention, a highly adaptable, relatively inexpensive, and efficient, portable flexible light transmitting device is provided. Because of its construction it can have many different lengths using the same light source, its light transmitting properties are excellent, and it can be made relatively inexpensively. The device can be incorporated in almost any type of container, particularly wearable containers made primarily of fabric such as fanny packs and backpacks, or in other types of containers such as clutches or lunch boxes. The basic elements of the device of the invention that achieve these desirable results are one or more LEDs, a flexible light transmitting band positioned immediately adjacent but not embedding the LED(s) so that light is efficiently transmitting from the LED(s) along the light transmitting element, and an external battery and circuitry. The lighted band is desirably mounted on a flexible/wearable container so that it is visible from the exterior thereof, and the external battery and circuitry are mounted within the container.

As in co-pending patent application Ser. No. 14/544,688 filed Feb. 4, 2015, the term "immediately adjacent" in the specification and claims means that an LED is directly aligned with an end of the light transmitting element (in this case a substantially flat band), is less than two centimeters away from it, and preferably essentially touches it. Also as in said co-pending application, the flexible elongated light transmitting element (in this case a substantially flat band) preferably comprises high clarity translucent or transparent thermoplastic polymeric material, such as thermoplastic polyurethane (although other high clarity thermoplastic materials, such as shown in U.S. Pat. No. 5,879,076, may be utilized). Desirably the polymeric material is clear, however it can have a tint (e.g. red, blue, or yellow) if desired.

The term "fabric" as used in the present specification and claims means a flexible cloth-like sheet material that may be formed into a container. Non-limiting examples include nylon, polyimide, polyester, wool, hemp, and natural or synthetic leather.

According to one aspect of the invention there is provided a light transmitting device comprising: a flexible elongated substantially flat band of high clarity light transmitting polymeric material having first and second ends; at least one LED mounted immediately adjacent but not embedded in the first end; a mounting structure which mounts the LED in the position immediately adjacent the first end; and electrical wiring extending outwardly from the LED and connectable to a power source. The band is desirably incorporated in a container made at least partially of fabric so that light emitted therefrom is visible from the exterior of the container.

For example, the container may comprise a wearable container selected from the group consisting essentially of fanny packs, backpacks, knapsacks, purses with a shoulder strap, shoulder bags, and belt mounted pouches. Alternatively the container is not wearable, and is selected from the group consisting essentially of lunch boxes, coolers, dopp kits, and clutches. The container preferably includes at least one zippered pouch, and the polymeric material preferably comprises thermoplastic polyurethane.

The device preferably further comprises a first printed circuit board including a battery operatively connected to the LED electrical wiring for powering the LED; and an electrical switch which ultimately, through circuitry, connects or disconnects the LED to/from the battery. Desirably, the printed circuit board is mounted within the container, and the electrical switch is accessible for actuation from the exterior of the container.

The device may further comprise a second printed circuit board operatively connected to the LED, and the mounting structure may include the second printed circuit board and at least one fastener which connects the second printed circuit board to the band at the first end thereof. The mounting structure may further comprise a heat shrink tube encapsulating the second printed circuit board, LED, and fastener(s).

The device may still further comprise at least one additional LED mounted immediately adjacent but not embedded in the second end of the band; a mounting structure which mounts the additional LED in position immediately adjacent the second end of the band; and electrical wiring extending outwardly from the additional LED and connectable to a power source.

Typically a flap of covering material is mounted over the band on the exterior of the container. The flap allows the passage of light therethrough but at least partially disguises the band when the LED is not energized. The flap is typically of a color compatible with the color of light from the LED (e.g. red or orange if the LED is red, but not blue). The flap is desirably stitched (or ultrasonically welded, or attached by adhesive) to a fabric panel of the container so that it holds the band in place on the container.

Desirably, the band is at least about one inch wide and has a thickness of at least about one-sixteenth of an inch According to another aspect of the invention there is provided a container at least partially (preferably primarily or substantially completely) of fabric having an interior and an exterior, and at least one fabric panel. The container includes a band of flexible polymeric material having first and second ends, and at least one LED mounted near or at the first end, and a flap of covering material mounted over the band on the exterior of the container. The flap allows the passage of light therethrough but at least partially disguises the band when the LED is not energized. The flap is connected to a the fabric panel of the container to hold the band in place on the exterior of the container. A battery is mounted in the interior of the container and operatively connected to the LED for powering the LED. An electrical switch, which ultimately, through circuitry, connects or disconnects the LED to/from the battery, is accessible for actuation from the exterior of the container.

The other details of the container and associated light transmitting device may be as described above.

It is the primary object of the present invention to provide a highly functional and advantageous light transmitting device, desirably associated with a container to enhance the aesthetics and/or functionality of the container. This and other objects of the invention will become clear from the detailed description of the drawings, and from the appended claims.

BRIEF DESCRIPTION OF THE DRAWINGS

FIG. 1 is an isometric view of an exemplary light transmitting device according to the invention;

FIG. 2 is an exploded view of one end of the device of FIG. 1;

FIG. 3 is a side view of the device of FIGS. 1 & 2 with the ends encapsulated in tubes of heat shrunk plastic;

FIG. 4 is a side view of an alternative shape of the flexible elongated substantially flat band of high clarity light transmitting polymeric material of the device of FIGS. 1-3 showing just the band without the LED and mounting structure;

FIG. 6 is an exploded view of the housing of FIG. 5 showing exemplary interior components;

DETAILED DESCRIPTION OF THE DRAWINGS

Figure 5:
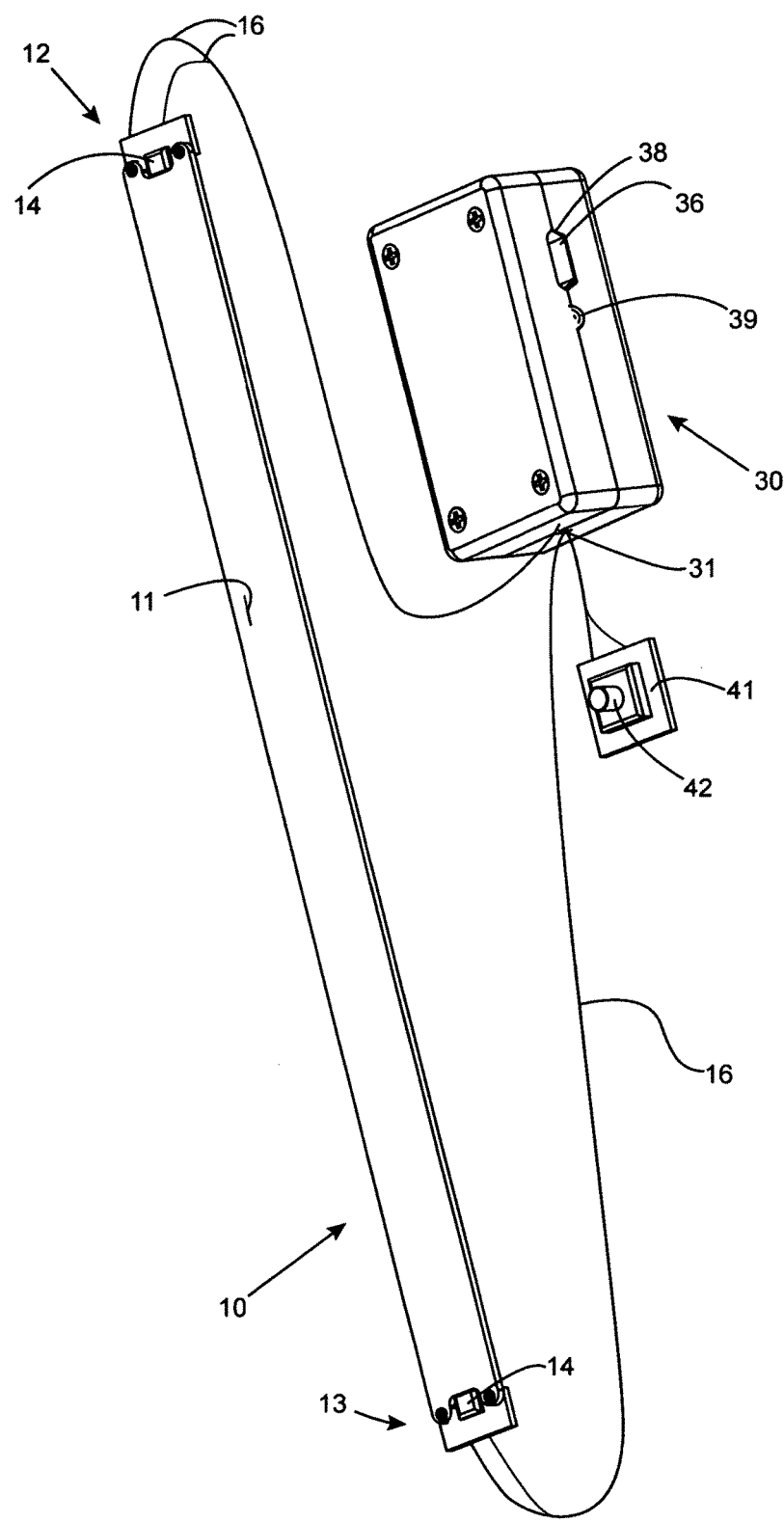
FIG. 5 is an isometric view of the device of FIGS. 1 & 2 operatively connected to a housing in which a battery is located, and to an electrical switch.

An exemplary light transmitting device according to the invention is shown generally by reference numeral 10 in the drawings, particularly FIGS. 1-3 & 5. The device 10 comprises a flexible elongated substantially flat band 11 of light transmitting polymeric material having first and second ends 12, 13, respectively. Preferably the polymeric material is of high clarity and most preferably is of thermoplastic polyurethane, although other light transmitting polymeric materials such as shown in U.S. Pat. No. 5,879,076 may be utilized. The substantially flat band 11 has a greater light surface area than a cable or cylinder of similar material. Desirably, the band 11 has a width W (see FIG. 2) of at least about one inch, e.g. about one-three inches, and a thickness T (FIG. 2) of at least about one sixteenth of an inch, e.g. about 1/16-3/8 inches.

The device 10 further comprises at least one LED 14 mounted immediately adjacent but not embedded in said first end 12, and a mounting structure, shown generally by reference numeral 15 in FIGS. 1-3, which mounts the LED 14 in the position immediately adjacent the first end 12. The device 10 further includes electrical wiring, shown generally by reference numeral 16 in FIGS. 1-3 & 5, extending outwardly from the LED 14 and connectable to a power source, such as the battery 18 in FIGS. 6 & 7.

The LED 14 may comprise any suitable commercially available or hereafter developed LED of virtually any color. One desirable form for the LED 14 is a 3528 SMD LED. Others include 2835 SMD, 335 SMD, and 5050 SMD 3 mm or 5 mm LEDs. Exemplary colors include red, white, orange, yellow, and blue.

The mounting structure 15 may have a variety of forms. One desirable form is illustrated most clearly in FIG. 2. The mounting structure 15 illustrated in FIG. 2 includes a printed circuit board 20 which the LED 14 is connected to and which has openings 21 therein for one or more fasteners 22, such as screws. The band 11 has openings 23 which cooperate with the openings 21 and fasteners 22 so that the screws 22 pass through the openings 23 into contact with the internally screw threaded openings 21 to hold the circuit board 20, and thus the LED 14, in place immediately adjacent to, but not embedded in, the band 11. The first end 12 of the band 11 may be sculptured—as indicated generally by reference numeral 25—to accommodate proper seating of the LED with respect to the band 11.

In addition to the mounting structure 15, or in place of it in some circumstances, a heat shrink tube 26—seen schematically in FIG. 3—may be provided. The tube 26, once heat shrunk into place, holds the printed circuit board 20, with mounted LED, in proper position with respect to the band 11. When used in combination with structure 15, the heat shrunk plastic of the tube 26 encapsulated the PCB 20, LED 14, and fasteners 22.

While the substantially flat band 11 is shown in FIGS. 1-3 & 5 as a generally uniform width generally rectangular piece of light transmitting polymeric material, it can have other shapes. One exemplary such other shape is shown for the band 111 in FIG. 4, having first and second ends 112, 113, respectively. In this configuration of the band 111 it has a varying width with one edge 27 substantially straight, and the other edge 28 curved. Other configurations are also possible.

As seen in FIGS. 1, 3, & 5, the band 11 preferably includes an additional LED 14 and mounting structure 15 at the second end 13 thereof substantially identical to those at the first end 12, so that light enters the band 11 from both ends thereof. Also, while just one LED 14 is illustrated at each end 12, 13, more than one LED may be provided at one or both ends.

Figure 7:
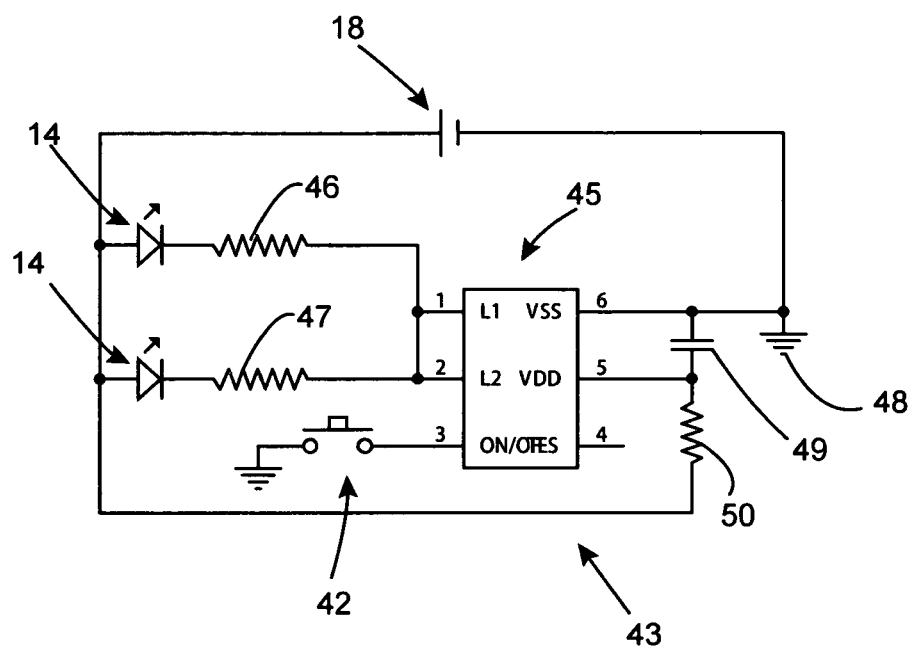
FIG. 7 is a circuit diagram of exemplary circuitry that may be provided for the electrical components of the device of FIGS. 5 & 6 which circuitry is comparable to FIG. 15 of said co-pending U.S. application Ser. No. 14/544,688 filed Feb. 4, 2015.

The device 10 is preferably utilized not just with the battery 18 (FIGS. 6 & 7), but with other electrical components, as seen in FIGS. 5-7. The wires 16 from LEDs 14 enter the housing 30 through an opening 31 therein. Desirably the housing 30 has a top 32 releasably held in contact with the bottom 33 by a plurality of fasteners such as screws 34. Positioned within the housing 30 is the battery 18 mounted on a printed circuit board 35.

While the battery 18 can be of any type (e.g. a plurality of conventional AAA or AA batteries, nine volt batteries, nickel hydride, etc.), battery 18 is schematically illustrated in FIG. 6 as a rechargeable lithium ion battery (e.g. with a capacity between 50 mAH—100,000 mAH). A USB port 36 is provided for charging the battery 18, as well as a battery charging indicator LED 37, mounted in the housing 30 openings 38, 39, respectively.

The circuitry associated with the PCB 35 is connected by wires 40 to the PCB 41 which mounts the electrical switch 42. Electrical switch 42, of any desired conventional type, ultimately, through circuitry (e.g. 43 in FIG. 7), connects or disconnects the LED(s) 14 to/from the battery 18. FIG. 7 illustrates exemplary circuitry 43 that may be utilized in the PCB 35 alone, or divided between the PCBs 20, 35 and 41.

The circuitry 43 includes an integrated circuit 45 having a first terminal 1 operatively connected to a first LED 14 through a resistor 46; a second terminal 2 operatively connected to a second LED 14 through a resistor 47; a third terminal 3 connected to the electrical switch 42; and two other terminals (5 and 6) connected to voltage from the battery 18 (terminal 5) and ground 48 (terminal 6), respectively, and operatively connected together with a capacitor 49. The capacitor 49 may be operatively connected to the LEDs 14 via a resistor 50.

In a preferred embodiment, the IC 45 controls operation of the LEDs 14 to define different sequences of operation. In one particular preferred embodiment, when the switch 42 (which may be an alternate action switch or a conventional dome switch) actuator is pushed a first time both LEDs 14 flash quickly. When the switch 42 actuator is pressed a second time, both LEDs 14 flash slowly. When the switch 42 actuator is pushed a third time, both LEDs 14 remain continuously on. Finally, when the switch 42 actuator is pushed a fourth time, both LEDs 14 are turned off.

Figure 8:
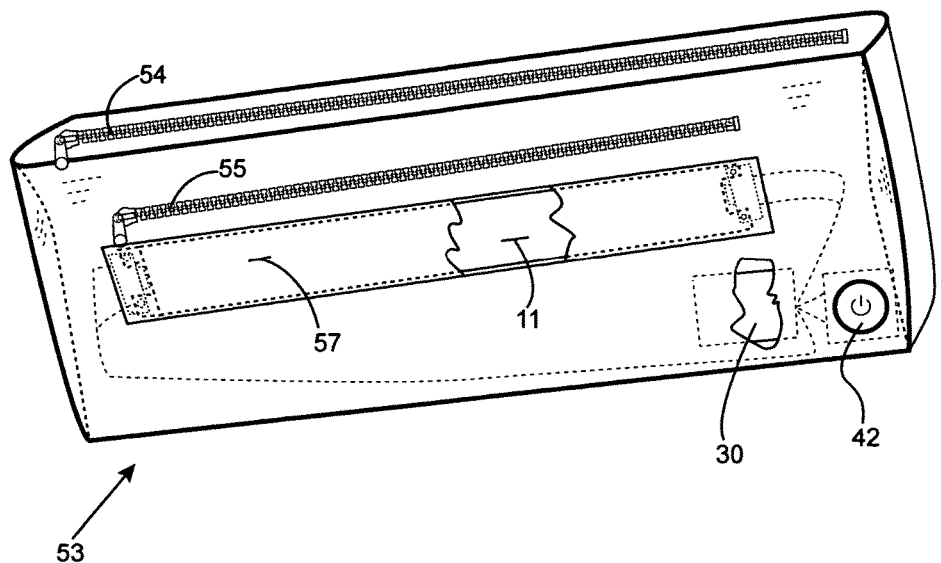
FIG. 8 is an isometric view of an exemplary container, in the form of a clutch or dopp kit, according to the invention utilizing the device of FIG. 5.

In the preferred embodiment of the invention, the band 11 is incorporated in a container made at least partially of fabric so that light emitted from band 11 is visible from the exterior of the container. The container can take a wide variety of forms. For example in FIG. 8, the container 53 is a clutch or dopp kit, such as one having zippers 54, 55 closing compartments in the container 53. The container 53 can also be a belt mounted pouch if on the back side thereof conventional loops for a belt are provided.

The container 53 has a fabric (e.g. ballistic nylon) front panel 56 which the device 10 is connected to. The band 11 and LEDs 14 of device 10 are covered by a flap 57 of covering material mounted over the device 10 on the exterior of the container 53. The flap 57 allows the passage of light therethrough but at least partially disguises the band 11 when the LED(s) 14 is/are not energized. The flap 57 may be made of a wide variety of materials, such as thin nylon, polyester, vinyl, polyethylene, or almost any other material that will allow light to pass through it. The flap 57 is of a color compatible with the color of light from the LED(s) 14. For example if the LED 14 is red the flap 57 is desirably red or orange, but not blue.

In a preferred embodiment the flap 57 is connected to the fabric panel 56 (e.g. by stitching, adhesive, ultrasonic welding, etc.) and holds the band 11 in place on the exterior of the container 53. Openings (not shown) are provided in the fabric panel 56 for the wires 16 to extend from the LEDs 14 on the exterior of the container 53 to the interior thereof. The housing 30 with battery 18 and PCB 35 is positioned in the interior of the container 53, while the switch 42 is preferably (although not necessarily) remote from the housing 30 and is accessible for actuation from the exterior of the container 53. For example the actuator for the switch 42 could actually extend through an opening in the fabric panel 56, or it could be attached to the interior of the panel 56 and an indicator provided on the exterior of panel 56 to show where to push to actuate the switch 42.

The container may comprise a wearable container, as the exemplary embodiments of FIGS. 9-12 show. In FIGS. 9-12 components similar to those of the FIG. 8 container are shown by the same reference numerals.

Figure 9:
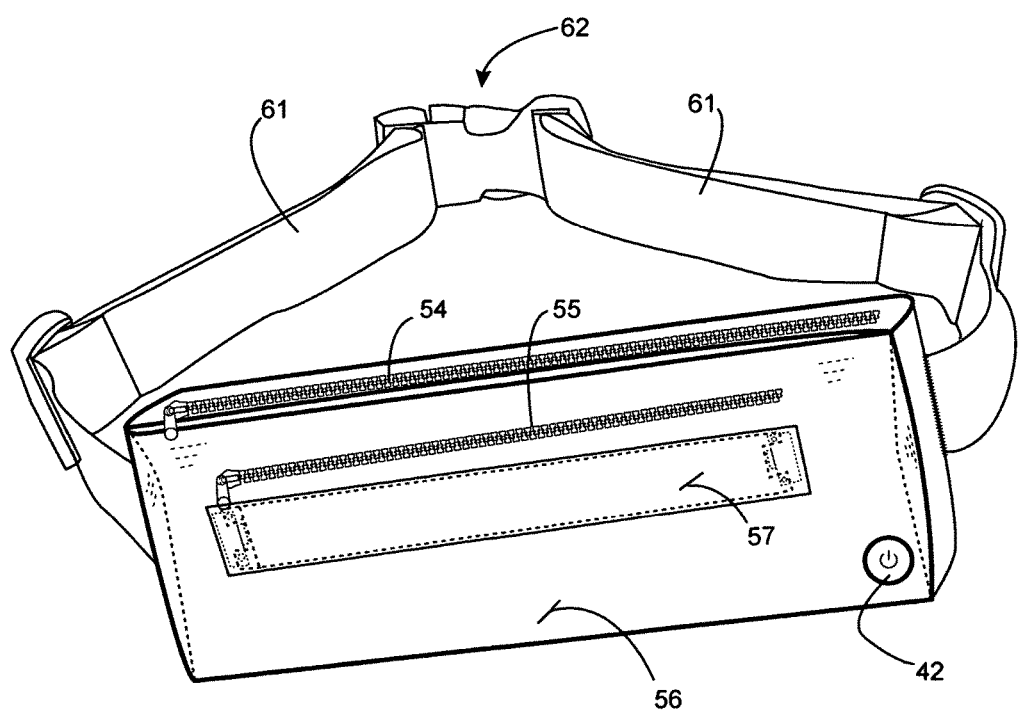
FIGS. 9 & 10 are views like that of FIG. 8 of an exemplary fanny pack and shoulder bag, respectively, according to the invention.

One form that a wearable container may take is the fanny pack 60 of FIG. 9. For example the fanny pack 60 may be substantially identical to the clutch 53 except that it has conventional webbing belts 61 sewn or otherwise attached to the sides of the container 60, and conventional buckle elements 62.

Figure 10:
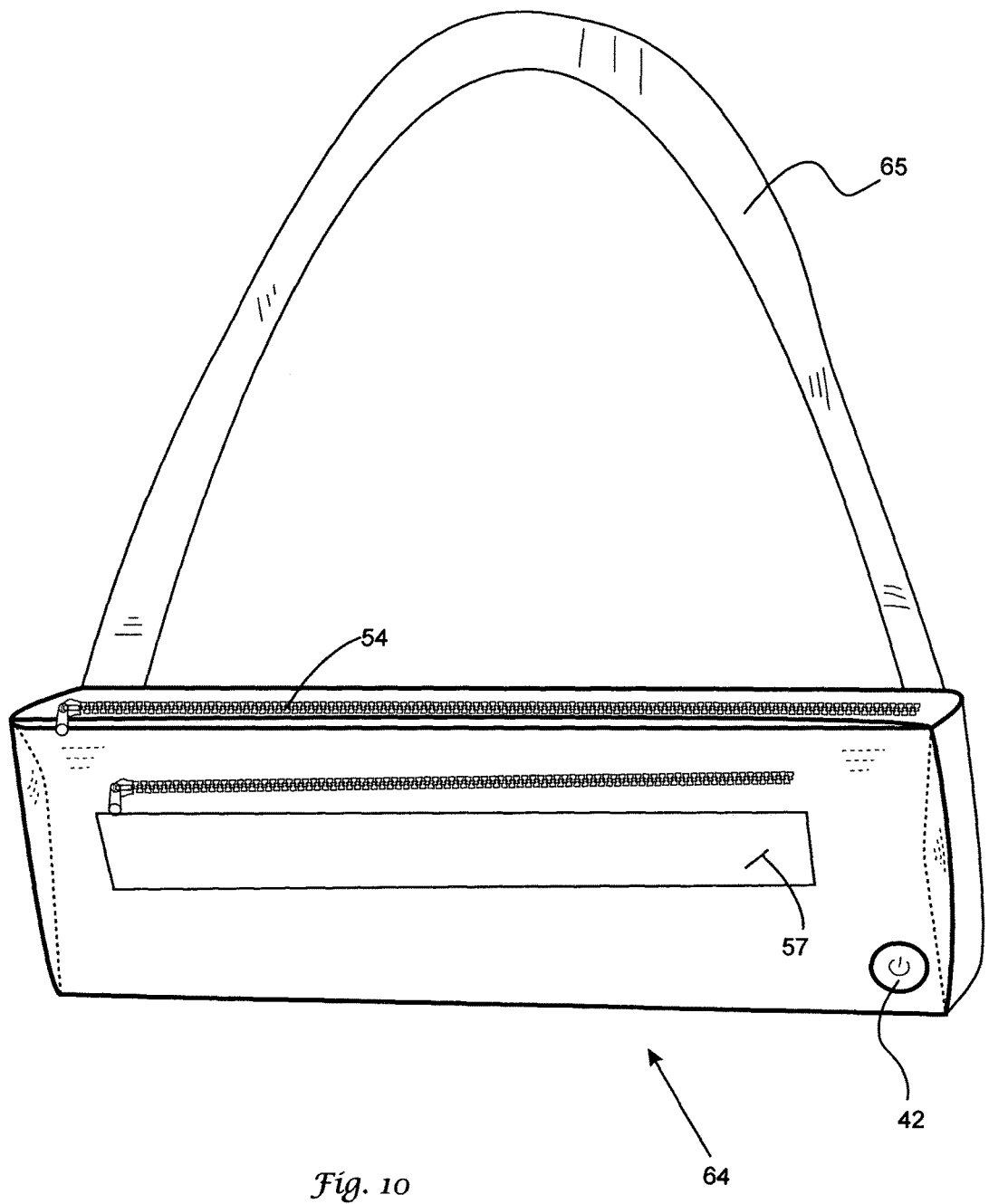

FIG. 10 shows a shoulder bag, or purse with a shoulder strap, 64 similar to the clutch 53 only with one or more shoulder straps 65 attached to the sides or rear of the container 64.

Figure 11:
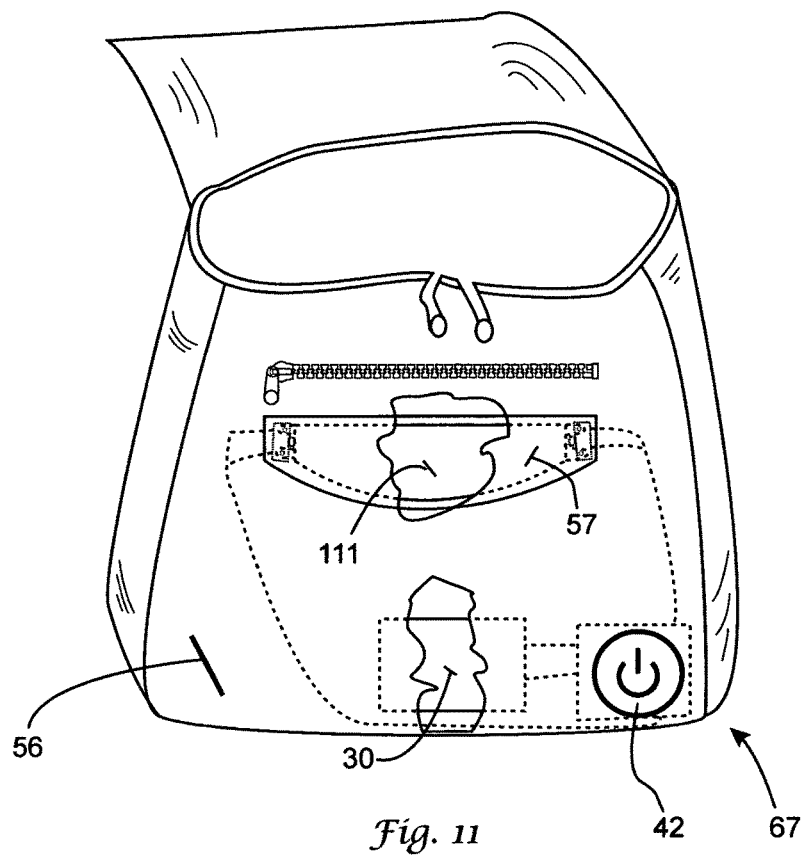
FIGS. 11 & 12 are front and rear isometric views, respectively, of an exemplary container according to the invention in the form of a backpack or knapsack and utilizing the device of FIG. 5.
Figure 12:
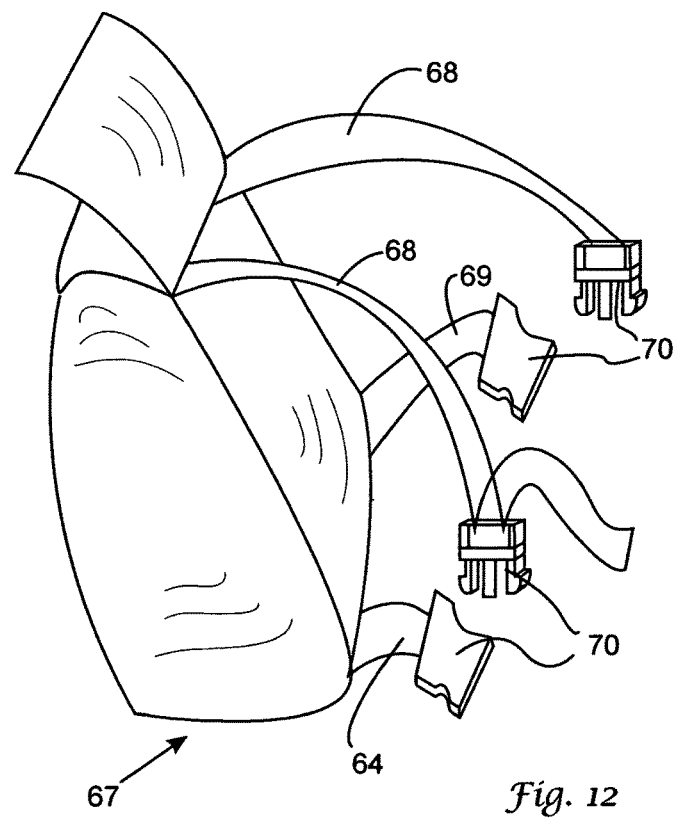

FIGS. 11 & 12 show a backpack or knapsack 67 with conventional straps 68, 69, and conventional buckles 70 (FIG. 12). In this embodiment a band 111, such as illustrated in FIG. 4, is provided on the front panel 56, and the flap 57 has a shape corresponding to that of the band 111.

The container with which the band 11 is associated need not be wearable, as seen in FIGS. 13-16. In FIGS. 13-16 components similar to those in FIGS. 8-12 are shown by the same reference numerals.

Figure 13:
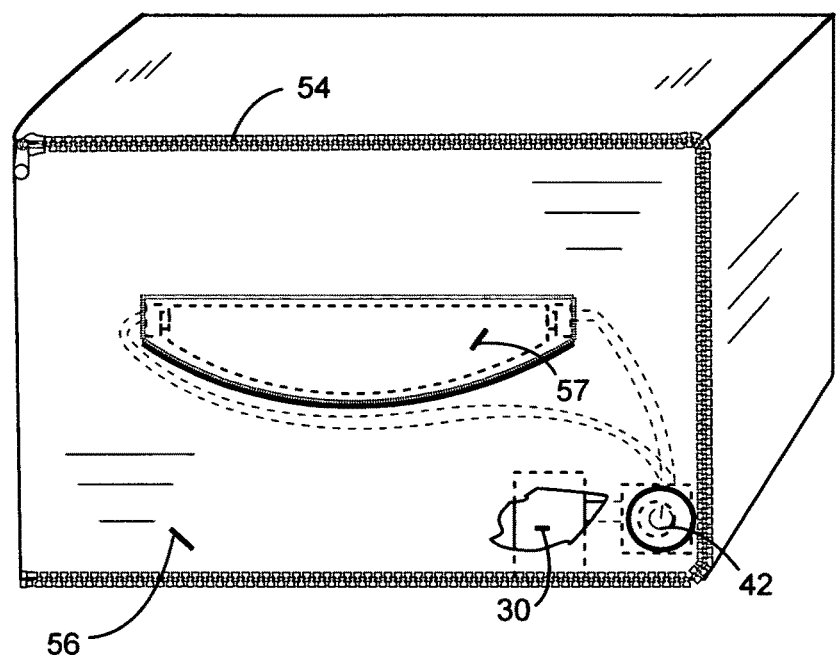
FIG. 13 is a front isometric view of an exemplary generic non-wearable container according to the invention utilizing the device of FIG. 5.
Figure 14:
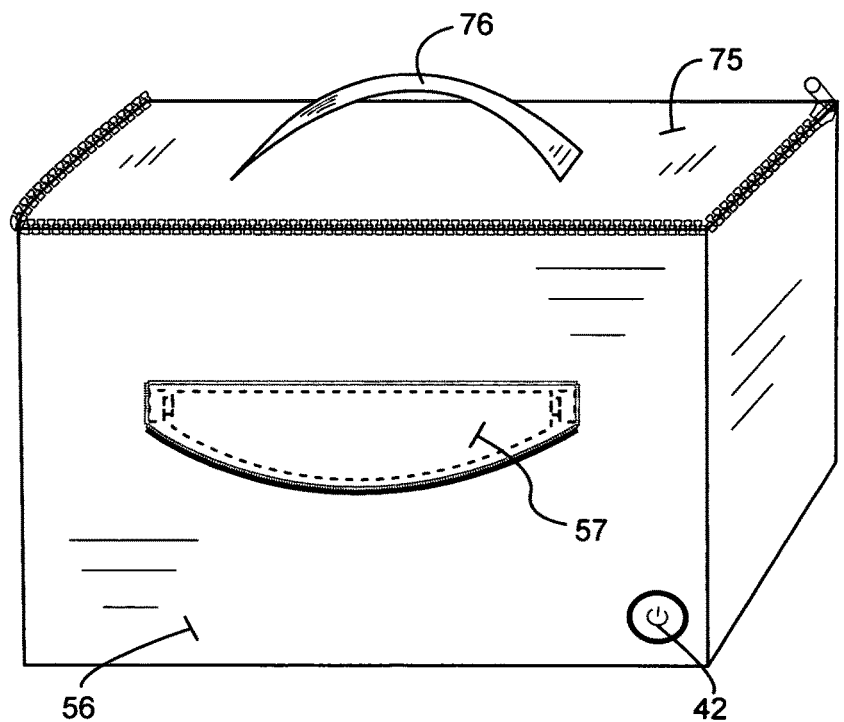
FIG. 14 is a view like that of FIG. 13 of an exemplary lunch box according to the invention.

For example, FIG. 13 illustrates an exemplary generic non-wearable container 73 which has a zipper 54 allowing access to the interior thereof. FIG. 14 shows a container 74 similar to the container 73, although with the zipper 54 allowing the top panel 75 to be opened to allow access to the interior thereof. A handle 76 is sewn or otherwise attached to the fabric top panel 75 so that the container 74 functions as a lunch box or the like.

Figure 15:
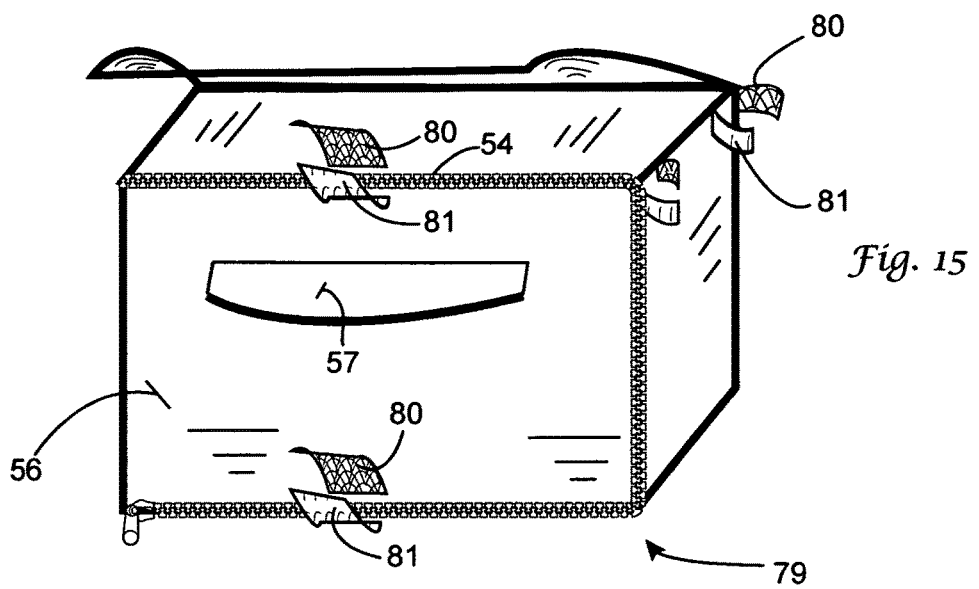
FIGS. 15 and 16 are views like that of FIG. 13 of an exemplary cooler according to the invention, the embodiment of FIG. 15 frameless, and that of FIG. 16 illustrated with a frame.
Figure 16:
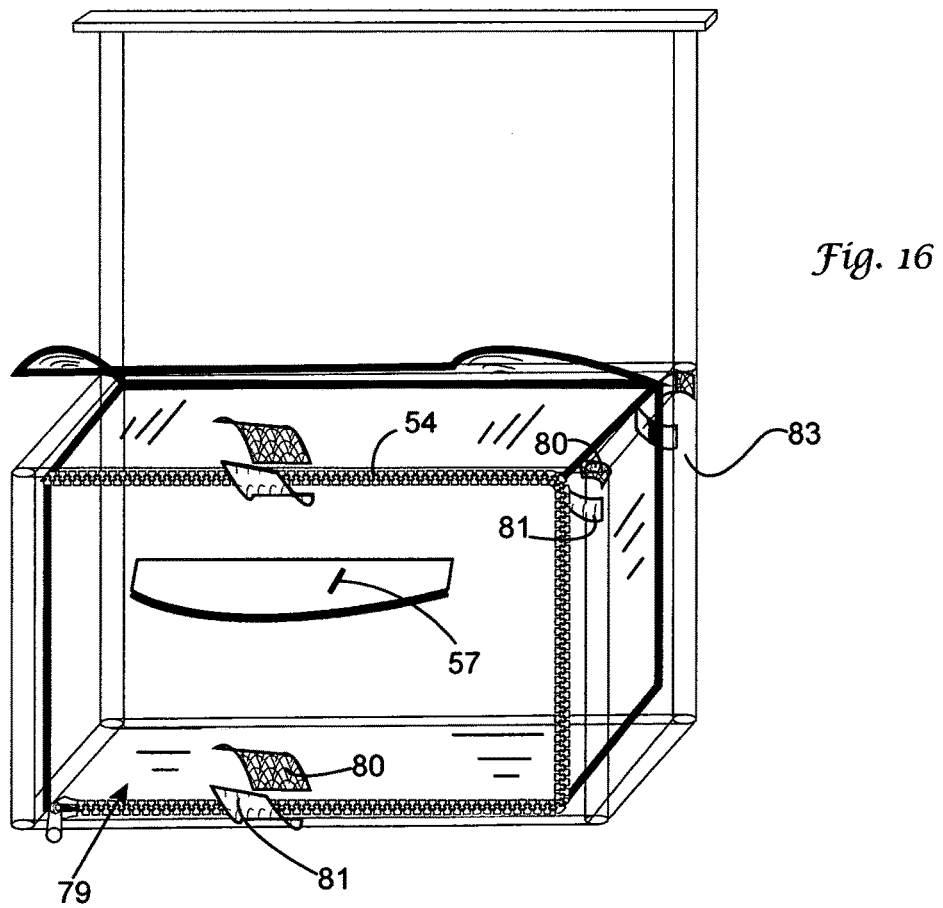

FIG. 15 shows a container 79 that may function as a cooler (and would typically have the panels thereof, such as front panel 56, of an insulating fabric sandwich or the like). The container 79 may have a plurality of hook and loop fastener (e.g. VELCRO) tabs 80, 81 sewn on or otherwise mounted at various portions thereof to connect the cooler 79 to a frame 83 for transport of the cooler 79.

Preferably, but not necessarily, most or substantially all of the panels of the containers illustrated in FIGS. 8-16 are of fabric. It is to be understood that FIGS. 8-16 are exemplary only, and the device 10 may be associated with any conventional or desired configuration of a container.

In all embodiments, when the switch 42 is actuated, the band 11 lights up and provides a relatively wide aesthetic or functional light source enhancing the aesthetics or functionality of the container (e.g. 53) with which it is associated. Yet the container does not have a particularly unusual appearance because the flap 57 covers the band 11.

While the invention has been herein shown and described in what is presently conceived to be a practical and preferred embodiment thereof, it is to be understood that many modifications may be provided within the scope of the invention, which scope is to be accorded the broadest interpretation of the appended claims consistent with the prior art to encompass all equivalent structures and devices.

What is claimed is:

1. A light transmitting device comprising: a flexible elongated substantially flat band of high clarity light transmitting polymeric material having first and second ends, said band having a greater light surface area than a cable or cylinder of similar material; at least one LED mounted immediately adjacent but not embedded in said first end; a mounting structure which mounts said LED in the position immediately adjacent said first end; and electrical wiring extending outwardly from said LED and connectable to a power source.

2. A device as recited in claim 1 wherein said band is incorporated in a container made at least partially of fabric so that light emitted therefrom is visible from the exterior of said container.

3. A device as recited in claim 2 wherein said container comprises a wearable container selected from the group consisting essentially of fanny packs, back packs, knapsacks, purses with a shoulder strap, shoulder bags, and belt mounted pouches.

4. A device as recited in claim 2 further comprising a first printed circuit board including a battery operatively connected to said LED electrical wiring for powering said LED; and an electrical switch which ultimately, through circuitry, connects or disconnects said LED to/from said battery; and wherein said printed circuit board is mounted within said container, and wherein said electrical switch is accessible for actuation from the exterior of said container.

5. A device as recited in claim 4 further comprising a second printed circuit board operatively connected to said LED; and wherein said mounting structure includes said second printed circuit board and at least one fastener which connects said second printed circuit board to said band at said first end thereof.

6. A device as recited in claim 5 wherein said mounting structure further comprises a heat shrink tube encapsulating said second printed circuit board, LED, and fastener.

7. A device as recited in claim 2 further comprising a flap of covering material mounted over said band on the exterior of said container, said flap allowing the passage of light therethrough but at least partially disguising said band when said LED is not energized.

8. A device as recited in claim 7 wherein said flap is stitched to a fabric panel of said container and holds said band in place on said container.

9. A device as recited in claim 2 wherein said container includes at least one zippered pouch, and wherein said polymeric material comprises thermoplastic polyurethane.

10. A device as recited in claim 2 wherein said container is selected from the group consisting essentially of lunch boxes, coolers, dopp kits, and clutches.

11. A device as recited in claim 1 further comprising at least one additional LED mounted immediately adjacent but not embedded in said second end of said band; a mounting structure which mounts said additional LED in position immediately adjacent said second end of said band; and electrical wiring extending outwardly from said additional LED and connectable to a power source.

12. A device as recited in claim 1 wherein said band is at least about one inch wide and has a thickness of at least about one-sixteenth of an inch.

13. A light transmitting device comprising: a flexible elongated substantially flat band of high clarity light transmitting polymeric material having first and second ends, said band having a greater light surface area than a cable or cylinder of similar material; at least one LED mounted immediately adjacent but not embedded in said first end; a mounting structure which mounts said LED in the position immediately adjacent said first end; electrical wiring extending outwardly from said LED and connectable to a power source; and a printed circuit board operatively connected to said LED; and wherein said mounting structure includes said printed circuit board and at least one fastener which connects said printed circuit board to said band at said first end thereof, and a heat shrink tube encapsulating said printed circuit board, LED, and fastener.

14. A container at least partially of fabric having an interior and an exterior, and at least one fabric panel;
a band of flexible polymeric material having first and second ends, and at least one LED mounted at or near said first end, said band having a greater light surface area than a cable or cylinder of similar material;
a flap of covering material mounted over said band on the exterior of said container, said flap allowing the passage of light therethrough but at least partially disguising said band when said LED is not energized, and said flap connected to a said fabric panel of said container to hold said band in place on the exterior of said container;
a battery mounted in the interior of said container and operatively connected to said LED for powering said LED; and
an electrical switch which ultimately, through circuitry, connects or disconnects said LED to/from said battery; and wherein said electrical switch is accessible for actuation from the exterior of said container.

15. A container as recited in claim 14 wherein said container comprises a wearable container selected from the group consisting essentially of fanny packs, backpacks, knapsacks, purses with shoulder straps, and belt mounted pouches.

16. A container as recited in claim 15 wherein said container includes at least one zippered pouch and is primarily or substantially completely made of fabric.

17. A container as recited in claim 14 further comprising: a mounting structure which mounts said LED in position immediately adjacent but not embedded in said first end of said band; and electrical wiring extending outwardly from said LED and connected to said battery.

18. A container as recited in claim 17 further comprising a printed circuit board operatively connected to said LED; and wherein said mounting structure includes said printed circuit board and at least one fastener which connects said second printed circuit board to said band at said first end thereof, and a heat shrink tube encapsulating said second printed circuit board, LED and fastener.

19. A container as recited in claim 17 further comprising at least one additional LED mounted immediately adjacent but not embedded in said second end of said band; a mounting structure which mounts said additional LED in a position immediately adjacent but not embedded in said second end of said band; and electrical wiring extending outwardly from said additional LED and connected to said battery.

20. A container as recited in claim 14 wherein said band is at least about one inch wide and has a thickness of at least about one-sixteenth of an inch.

* * * * *